US012789186B2

(12) United States Patent
Zitnick et al.

(10) Patent No.: US 12,789,186 B2
(45) Date of Patent: Nov. 10, 2026

(54) CARTRIDGE HAVING ELASTOMER VALVE

(71) Applicant: SEEGENE, INC., Seoul (KR)

(72) Inventors: Dana Zitnick, Warwick, RI (US); Leonid Silverman, Cranston, RI (US); Robert Roorda, Norwell, MA (US)

(73) Assignee: SEEGENE, INC., Seoul (KR)

( * ) Notice: Subject to any disclaimer, the term of this patent is extended or adjusted under 35 U.S.C. 154(b) by 843 days.

(21) Appl. No.: 18/170,308

(22) Filed: Feb. 16, 2023

(65) Prior Publication Data

US 2024/0278237 A1 Aug. 22, 2024

(51) Int. Cl.
*B01L 3/00* (2006.01)

(52) U.S. Cl.
CPC ..... *B01L 3/50273* (2013.01); *B01L 3/502738* (2013.01); *B01L 3/502761* (2013.01); *B01L 2200/04* (2013.01); *B01L 2200/16* (2013.01); *B01L 2300/049* (2013.01); *B01L 2300/123* (2013.01); *B01L 2400/0487* (2013.01); *B01L 2400/0677* (2013.01)

(58) Field of Classification Search
CPC ........... B01L 3/50273; B01L 3/502738; B01L 3/502761; B01L 2200/04; B01L 2200/16; B01L 2300/049; B01L 2300/123; B01L 2400/0487; B01L 2400/0677
See application file for complete search history.

(56) References Cited

U.S. PATENT DOCUMENTS 4,683,195 A 7/1987 Mullis et al.
4,683,202 A 7/1987 Mullis
4,800,159 A 1/1989 Mullis et al.
5,210,015 A 5/1993 Gelfand et al.
5,499,909 A 3/1996 Yamada et al.
5,876,930 A 3/1999 Livak et al.
6,117,635 A 9/2000 Nazarenko et al.
6,531,417 B2 3/2003 Choi et al.
6,977,295 B2 12/2005 Belotserkovskii et al.
7,348,141 B2 3/2008 French et al.
7,537,886 B1 5/2009 Nazarenko et al.
2012/0266986 A1* 10/2012 Wimberger-Friedl ....................... F16K 99/0001 137/565.01
2013/0142709 A1* 6/2013 Lin ........................ G01N 27/26 422/537
2013/0203634 A1* 8/2013 Jovanovich ......... F16K 99/0015 506/26
2017/0189904 A1* 7/2017 Aravanis ................. B01L 7/525
2019/0224667 A1* 7/2019 Samsoondar ...... G01N 33/4905

FOREIGN PATENT DOCUMENTS

WO 2011/037306 A1 3/2011
WO 2012/096523 A2 7/2012
WO 2013/115442 A1 8/2013
WO 2014/104818 A1 7/2014

* cited by examiner

*Primary Examiner* — Benjamin R Whatley
(74) *Attorney, Agent, or Firm* — Sughrue Mion, PLLC

(57) ABSTRACT

The cartridge for detecting a target analyte according to the present invention comprises a mainframe comprising a chamber, a passage connected to the chamber, and a valve connected to the passage; an elastic member located on a one side of the mainframe and covering the passage and the valve; and a subframe located on a front side of the elastic member, wherein the subframe has a pressure supply hole at a portion corresponding to the valve and supplies a pressure to the elastic member through the pressure supply hole.

12 Claims, 6 Drawing Sheets

CARTRIDGE HAVING ELASTOMER VALVE

TECHNICAL FIELD

The present invention relates to a cartridge for detecting a target analyte.

BACKGROUND ART

Nowadays people's interest in health increases and life expectancy extends. Thus, accurate analysis of pathogens and in vitro nucleic acid-based molecular diagnosis such as genetic analysis for a patient become significant, and the demand therefor is on the rise. Nucleic acid-based molecular diagnosis is performed by extracting nucleic acids from a sample and confirming whether a target nucleic acid is present in the extracted nucleic acids.

Polymerase chain reaction (PCR) is the most widely used nucleic acid amplification method, and the PCR process is performed by repeated cycling including denaturation of double-stranded DNA, annealing of oligonucleotide primers to the DNA templates and extension of primers by DNA polymerase (Mullis et al.; U.S. Pat. Nos. 4,683,195, 4,683,202 and 4,800,159; Saiki et al., (1985) Science 230, 1350-1354).

Real-time PCR using a fluorescent material is a method of detecting an increase in fluorescence intensity according to nucleic acid amplification during the PCR process. Real-time PCR enables multiplex detection by using different fluorescent dyes for each target; however, the technique requires expensive equipment and a lot of time for detection.

Meanwhile, recently, point of care testing which diagnoses patient's diseases quickly and correctly at any time and any place draws attention as a very significant technique of evidence-based precision health.

A cartridge and a detection apparatus used for POC diagnosis should satisfy portability, economic feasibility, and rapidity. Thus, the cartridge and apparatus require not only a simpler structure in compact size but also rapid processing time and precise fluid control. For a PCR process, a plurality of chambers and passages are needed, and a valve for controlling the flow of fluids therebetween is additionally needed.

POC diagnostic devices generally use an electric valve (solenoid valve) or a motor operated valve. However, the POC cartridge or detection apparatus using an electric valve or a motor operated valve is large and expensive, which weaken the competitiveness of POC diagnostic devices.

SUMMARY OF INVENTION

Technical Task

The present invention provides a cartridge for detecting a target analyte, comprising a valve structure which makes the cartridge smaller in size and quickly and accurately opens and closes a passage.

Also, the present invention provides an apparatus for detecting a target analyte with an improved structure of a valve drive unit of the detection apparatus which operates a valve of a cartridge.

Means for Solving the Task

An embodiment of the present invention provides a cartridge for detecting a target analyte, comprising: a mainframe comprising a chamber, a passage connected to the chamber and a valve connected to the passage on a front side; an elastic member located on the front side of the mainframe and covering the passage and the valve; and a subframe located on a front side of the elastic member, wherein the subframe has a pressure supply hole at a portion corresponding to the valve and wherein the elastic member can be supplied with a pressure through the pressure supply hole.

According to one embodiment of the present invention, the elastic member may be elastically deformable and coupled between the mainframe and the subframe.

According to one embodiment of the present invention, the elastic member may be formed in an elastic pad type and coupled, in a compressed state, between the mainframe and the subframe.

According to one embodiment of the present invention, the valve may be a normally open (NO) valve that is closed when a pressure is supplied to the elastic member through the pressure supply hole.

According to one embodiment of the present invention, the valve may comprise a valve chamber fluidly connected to the passage and having a width greater than a width of the passage and a fluid resistance element providing a fluid resistance force in the flow direction of a fluid passing through the valve chamber.

According to one embodiment of the present invention, the valve chamber may have a shape that narrows in the direction of the passage at a portion connected to the passage.

According to one embodiment of the present invention, the valve chamber may have a depth shallower than a depth of the passage.

According to one embodiment of the present invention, the fluid resistance element may be formed by a ridge protruding from the one side of the mainframe and crossing over the valve chamber in the width direction.

According to one embodiment of the present invention, the fluid resistance element may be arranged together with a passage wall forming the passage and a valve wall forming the valve chamber in the front side of the mainframe to have the same height to each other.

According to one embodiment of the present invention, the passage wall, the valve wall, and the fluid resistance element may be formed by a ridge protruding from the front side of the mainframe.

According to one embodiment of the present invention, the pressure supply hole of the subframe may be located in correspondence with the fluid resistance element, and wherein the elastic member is interposed between the pressure supply hole and the fluid resistance element.

According to one embodiment of the present invention, the subframe may comprise an inlet of the pressure supply hole is disposed in a front side of the subframe, and an outlet of the pressure supply hole is disposed in a back side of the subframe facing the elastic member and has an area greater than an area of the inlet of the pressure supply hole.

According to one embodiment of the present invention, the outlet of the pressure supply hole may have a shape corresponding to the edge of the valve chamber or is disposed inside the edge of the valve chamber.

According to one embodiment of the present invention, the mainframe may comprise a first chamber positioned on one side of the passage where the valve is provided, a second chamber positioned on the other side thereof and a chamber connection path connecting the first chamber and the second chamber, wherein the passage where the valve is provided communicates with the chamber connection path.

According to one embodiment of the present invention, the valve may comprise a first valve positioned on one side of the chamber connection path and a second valve positioned on the other side thereof, wherein in a state in which both the first valve and the second valve are closed, a fluid flows between the first chamber and the second chamber, wherein in a state in which the second valve is closed and the first valve is opened, the fluid of at least one chamber selected from the group consisting of the first chamber, the second chamber and a combination thereof flows in one direction of the flow path through the first valve, wherein in a state in which the first valve is closed and the second valve is opened, the fluid of at least one chamber selected from the group consisting of the first chamber, the second chamber and a combination thereof flows in the other direction of the flow path through the second valve.

According to one embodiment of the present invention, the passage, the first valve, the second valve and the chamber connection path may be formed on the front side of the mainframe, and the first chamber and the second chamber are formed on the back side of the mainframe.

According to one embodiment of the present invention, the passage may comprise a front passage formed in the front side of the mainframe, a back passage formed in the back side of the mainframe and a through passage formed through the mainframe to connect the front passage and the back passage.

According to an embodiment of the present invention, one end of the through passage may be provided in the valve chamber of the front side of the mainframe, and the other end of the through passage may be connected to the back passage of the back side of the mainframe.

According to one embodiment of the present invention, the valve may comprise a first valve chamber positioned on one side of the fluid resistance element and connected to the front passage, and a second valve chamber positioned on the other side of the fluid resistance element and connected to the through passage.

Another embodiment of the present invention provides an apparatus for detecting a target analyte comprises an air pressure pump supplying an air pressure to the pressure supply hole of cartridge according to claim 1.

Effect of Invention

According to an embodiment of the present invention, a POC device capable of using a compact and light cartridge with rapidity and accuracy and a cartridge may be provided.

Also, a device may be made compact by simplifying the structure of a drive unit for driving a valve, and the manufacturing costs may be reduced.

The effects of the present invention are not limited to the above-mentioned effects, and it should be understood that the effects of the present invention include all effects that could be inferred from the configuration of the invention described in the detailed description of the invention or the appended claims.

DETAILED MEANS FOR CARRYING OUT THE INVENTION

Figure 1:
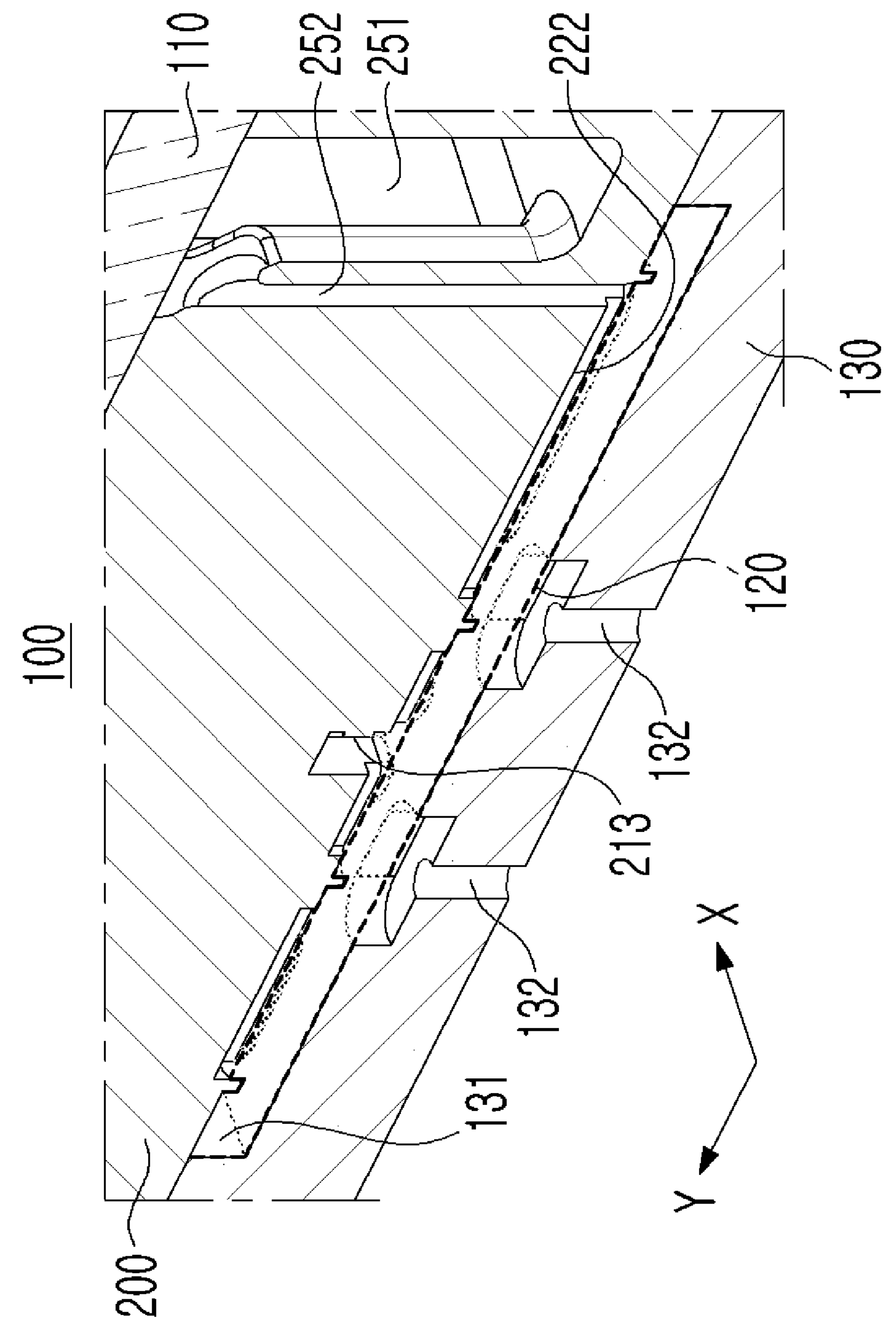
FIG. 1 is a top perspective cross-sectional view illustrating a cartridge according to an embodiment of the present specification.

Hereinafter, the present invention will be explained with reference to embodiments and example drawings. The embodiments are for illustrative purposes only, and it should be apparent to a person having ordinary knowledge in the art that the scope of the present invention is not limited to the embodiments.

In addition, in adding reference numerals to the components of each drawing, it should be noted that same reference numerals are assigned to same components as much as possible even though they are shown in different drawings. In addition, in describing the embodiments of the present invention, when it is determined that a detailed description of a related well-known configuration or function interferences with the understanding of the embodiments of the present invention, the detailed description thereof will be omitted.

In addition, in describing the components of the embodiments of the present invention, terms such as first, second, A, B, (a), (b), (i), (ii), etc. may be used. These terms are only for distinguishing the components from other components, and the nature or order of the components is not limited by the terms. When a component is described as being "connected," "coupled" or "fastened" to other component, the component may be directly connected or fastened to the other component, but it will be understood that another component may be "connected," "coupled" or "fastened" between the components.

A present specification relates to an apparatus for detecting a target analyte in a sample.

As used herein, the term "sample" may include a biological sample (e.g., cells, tissues, and fluids from a biological source) and a non-biological sample (e.g., food, water, and soil). Examples of the biological sample may include viruses, bacteria, tissues, cells, blood (e.g., whole blood, plasma, and serum), lymph, bone marrow fluid, *salvia*, sputum, swab, aspiration, milk, urine, feces, ocular fluid, semen, brain extract, spinal fluid, joint fluid, thymus fluid, bronchoalveolar lavage fluid, ascites, and amniotic fluid. Also, the sample may include natural nucleic acid molecules isolated from a biological source and synthetic nucleic acid molecules. According to an embodiment of the present specification, the sample may include an additional substance such as water, deionized water, saline solution, pH buffer, acid solution or alkaline solution.

A target analyte refers to a substance that is the subject of analysis. The analysis may mean obtaining information on, for example, the presence, amount, concentration, sequence, activity, or property of the analyte in the sample. The analyte may include various substances (e.g., biological substance and non-biological substance such as compounds). Specifically, the analyte may include a biological substance such as nucleic acid molecules (e.g., DNA and RNA), proteins, peptides, carbohydrates, lipids, amino acids, biological compounds, hormones, antibodies, antigens, metabolites, or cells. According to an embodiment of the present specification, the analyte may be nucleic acid molecules.

The sample may include an optical label in the present specification. The optical label means a label that generates an optical signal depending on the presence of a target nucleic acid. The optical label may be a fluorescent label. The fluorescent label herein may include any molecule known in the art.

The apparatus for detecting a target analyte of the present specification may be an apparatus for detecting a target nucleic acid. The apparatus for detecting a target nucleic acid allows a nucleic acid reaction to be performed in a sample, to detect a target nucleic acid.

The nucleic acid reaction refers to sequential physical and chemical reactions which generate a signal depending on the presence of a nucleic acid of a specific sequence in the sample or the amount thereof. The nucleic acid reaction may include the binding of a nucleic acid of a specific sequence in a sample to other nucleic acids or substances, and replication, cleavage, or decomposition of a nucleic acid of a specific sequence in the sample. The nucleic acid reaction may involve a nucleic acid amplification reaction. The nucleic acid amplification reaction may include amplification of a target nucleic acid. The nucleic acid amplification reaction may specifically amplify the target nucleic acid.

The nucleic acid reaction may a signal-generation reaction which can generate a signal depending on the presence/absence of a target nucleic acid in the sample or the amount thereof. The signal-generation reaction may be a technique of genetic analysis such as PCR, real-time PCR, or microarray.

Various methods for generating an optical signal which indicates the presence of a target nucleic acid using a nucleic acid reaction are known. Representative examples thereof include the following: TaqMan™ probe method (U.S. Pat. No. 5,210,015), molecular beacons method (Tyagi et al., Nature Biotechnology v. 14 Mar. 1996), scorpion method (Whitcombe et al., Nature Biotechnology 17:804-807 (1999)), sunrise or amplifluor method (Nazarenko et al., 2516-2521 Nucleic Acids Research, 25(12):2516-2521 (1997), and U.S. Pat. No. 6,117,635), lux method (U.S. Pat. No. 7,537,886), CPT (Duck P, et al., Biotechniques, 9:142-148(1990)), LNA method (U.S. Pat. No. 6,977,295), plexor method (Sherrill C. B., et al, Journal of the American Chemical Society, 126:4550-4556(2004)), Hybeacons™ (D. J. French, et al., Molecular and Cellular Probes (2001) 13, 363-374 and U.S. Pat. No. 7,348,141), dual-labeled, self-quenched probe (U.S. Pat. No. 5,876,930), hybridization probe (Bernard P. S., et al., Clin Chem 2000, 46, 147-148), PTOCE (PTO cleavage and extension) method (WO 2012/096523), PCE-SH (PTO Cleavage and Extension-Dependent Signaling Oligonucleotide Hybridization) method (WO 2013/115442), PCE-NH (PTO Cleavage and Extension-Dependent Non-Hybridization) method (PCT/KR2013/012312) and CER method (WO 2011/037306).

An apparatus for detecting a target analyte according to an embodiment of the present specification may be an apparatus for detecting a nucleic acid and may detect a signal generated depending on the presence of the target nucleic acid. The apparatus for detecting a nucleic acid may amplify and detect a signal with nucleic acid amplification. Alternatively, the apparatus for detecting a nucleic acid may amplify and detect a signal without nucleic acid amplification. Preferably, the apparatus for detecting a nucleic acid detects a signal with nucleic acid amplification.

An apparatus for detecting a target analyte according to an embodiment of the present specification may comprise a nucleic acid amplifier.

A nucleic acid amplifier refers to an apparatus for performing a nucleic acid amplification reaction which amplifies a nucleic acid having a specific nucleotide sequence. Examples of the method for amplifying a nucleic acid include polymerase chain reaction (PCR), ligase chain reaction (LCR) (U.S. Pat. Nos. 4,683,195 and 4,683,202; PCR Protocols: A Guide to Methods and Applications (Innis et al., eds, 1990)), strand displacement amplification (SDA) (Walker, et al. Nucleic Acids Res. 20(7):1691-6 (1992); Walker PCR Methods Appl 3(1):1-6 (1993)), transcription-mediated amplification (Phyffer, et al., J. Clin. Microbiol. 34:834-841 (1996); Vuorinen, et al., J. Clin. Microbiol. 33:1856-1859 (1995)), nucleic acid sequence-based amplification (NASBA) (Compton, Nature 350(6313):91-2 (1991)), rolling circle amplification (RCA) (Lisby, Mol. Biotechnol. 12(1):75-99 (1999); Hatch et al., Genet. Anal. 15(2):35-40 (1999)) and Q-beta Replicase (Lizardi et al., BiolTechnology 6:1197 (1988)), etc.

An apparatus for detecting a target analyte according to an embodiment of the present specification may be an apparatus for performing a nucleic acid amplification reaction with temperature changes. For example, the nucleic acid amplifier may carry out a denaturing step, an annealing step, and an extension (or elongation) step to amplify deoxyribonucleic acid (DNA) having a specific base sequence.

In the denaturing step, a sample and reagent solution containing double-stranded DNA templates is heated to a specific temperature, for example about 95° C., to separate double-stranded DNA into single-stranded DNA. In the annealing step, an oligonucleotide primer having a nucleotide sequence complementary to the nucleotide sequence of a nucleic acid to be amplified is provided, and the primer and the separated single-stranded DNA are cooled down to a specific temperature, for example 60° C., to promote the primer binding to the specific nucleotide sequence of the single-stranded DNA to form a partial DNA-primer complex. In the extension step, the solution is maintained at a specific temperature, for example 72° C., after the annealing step to form double-stranded DNA by DNA polymerase based on the primer of the partial DNA-primer complex.

The aforementioned three steps are repeated, for example 10 to 50 times, geometrically amplifying DNA having the specific nucleotide sequence. In some cases, the nucleic acid amplifier may perform the annealing step and extension step simultaneously. In this case, the nucleic acid amplifier may complete one cycle by performing two steps including a denaturing step and an annealing/extension step.

Particularly, an apparatus for detecting a target analyte according to an embodiment may be an apparatus for performing a nucleic acid amplification reaction with temperature changes and a reaction of generating an optical signal depending on the presence of a nucleic acid and detecting the generated optical signal.

In addition, the apparatus for detecting a target analyte according to an embodiment may be a point-of-care (POC) diagnosis device, which is a miniaturized on-site diagnosis device.

The apparatus for detecting a target analyte according to an embodiment may include a holding module for holding a cartridge, a fluid transportation module, an extraction module, a thermo-control module, a sensing module and a controller that controls the same.

The holding module may include a fixed type in which the user directly holds the cartridge at a predetermined position, and a moving type which receives the cartridge from the outside of the apparatus for detecting a target analyte and automatically holds the cartridge at a predetermined position.

The fluid transportation module may provide power for transporting a fluid comprising a sample, a reagent, or a buffer. The reagent may mean a distinction from a buffer, or may mean including a buffer in some cases.

When the cartridge is provided in a well type, fluid transportation may be performed by using a syringe pump. Alternatively, when the cartridge is provided in a microfluidic type, the fluid transportation may be performed by using a pump and a valve in or out of the micro device. Here, the micropump and the microvalves often require an additional driving force. Examples of drive mechanisms for the micropump include check valves or peristaltic, rotary, centrifugal, ultrasonic, electro-hydrodynamic, electro-kinetic, phase transfer (requiring a change in temperature or pressure), electrowetting, magnetic or hydrodynamic mechanisms, and the like. Examples of drive mechanisms for microvalves include pneumatic, thermopneumatic, thermomechanical, piezoelectric, electrostatic, electromagnetic, electrochemical or capillary mechanisms, and the like (Reference examples: U.S. Pat. Nos. 6,531,417; 5,499,909; Kamper, K. P. et al., "A self-filling low-cost membrane micropump", The 11$^{th}$ annual international workshop on MEMS, 1998 Heidelberg Germany, 432-437; Maillefer, D. et al., "A high-performance silicon micropump for disposable drug delivery systems", The thirteenth IEEE International Micro Electro Mechanical Systems (MEMS) 2000 Conference, Miyazaki, Japan, 413-417; Gu, W. et al., Proc. Natl. Acad. Sci. U.S.A (2004), 101, 45, 15861-15866).

The extraction module may be used to extract the target analyte from a sample. For example, nucleic acids can be extracted from a sample. The extraction module may include a magnet used to manipulate magnetic beads to which the nucleic acid is bound, and a mixing means used to mix the sample and the reagent for the extraction process. For example, the mixing means may include an ultrasonic horn.

The thermos-control module may be used to control the temperature in a process such as a target analyte extraction reaction or a target analyte detection reaction. For example, the thermos-control module can be used to control temperature in a nucleic acid extraction reaction or a nucleic acid amplification reaction. The thermos-control module may include a heating element, a heat sink, a cooling fan, or a temperature sensor. For example, the heating element may include a Peltier element or a hot wire.

The sensing module may be used to sense a target analyte. The sensing of the target analyte may use an optical method or a chemical method. For example, the sensing module may be an optical module or an electrochemical module.

The optical module may detect a target analyte using a method such as fluorescence or color change sensing, or absorbance or reflectance measurement. For example, the optical module may detect fluorescence emitted from a fluorescent material labeled on a target nucleic acid sequence.

And the optical module may include a light emitting unit for supplying an appropriate optical stimulus to a sample accommodated in the sample holder and a detection unit for detecting an optical signal generated from the sample in response to the optical stimulus.

The optical signal may be luminescence, phosphorescence, chemiluminescence, fluorescence, polarized fluorescence or colored signal. The optical signal may generate in response to an optical stimulus applied to the sample. For example, the light emitting unit may include an LED or a laser, and the detection unit may include a charge coupled device (CCD), a complementary metal oxide semiconductor field effect transistor (CMOS), a photodiode or the like.

The electrochemical module may electrically sense an occurrence of a chemical reaction or a change in the degree of a chemical reaction according to the presence or absence of a target analyte in a sample or a change in its amount. For example, the electrochemical module may sense a change in the target analyte in the sample by detecting a change in pH or resistance according to an increase in the target analyte or an electrochemical signal generated by binding of the target analyte and the active material. The electrochemical module may include an electrode unit and an electrical signal measurement unit.

The detection electrode may be made of, for example, an alloy including gold (Au), cobalt (Co), platinum (Pt), silver (Ag), carbon nanotube, graphene, carbon (C) or any one or more thereof.

The electrical signal measuring unit includes, for example, an anodic stripping voltammetry (ASV), a chronoamperometry (CA), a cyclic voltammetry, a square wave voltammetry (SWV), a pulse voltammeter (differential pulse voltammetry, DPV) or an impedance meter.

Figure 2:
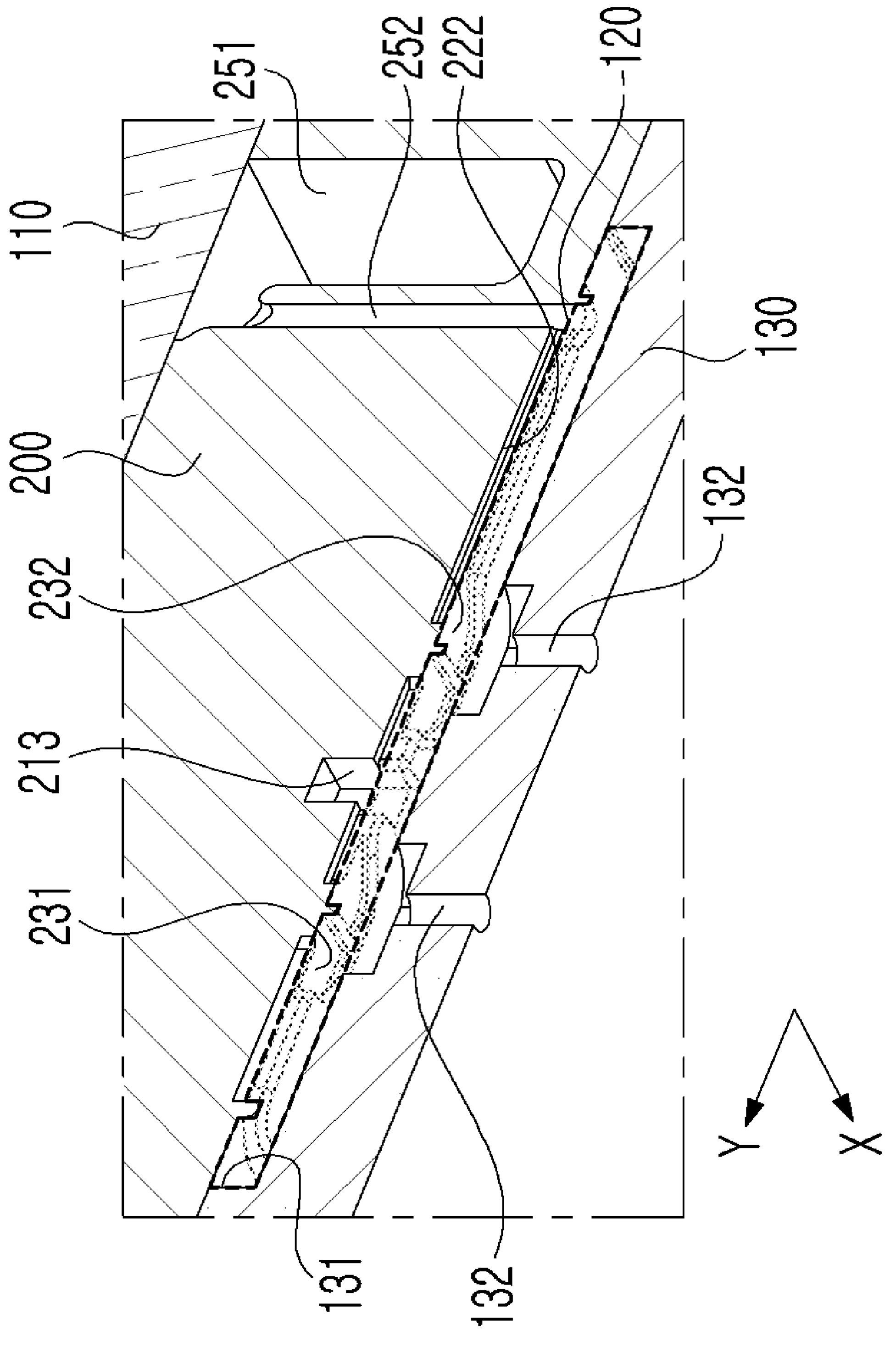
FIG. 2 is a bottom perspective cross-sectional view illustrating a cartridge according to an embodiment of the present specification.
Figure 3:
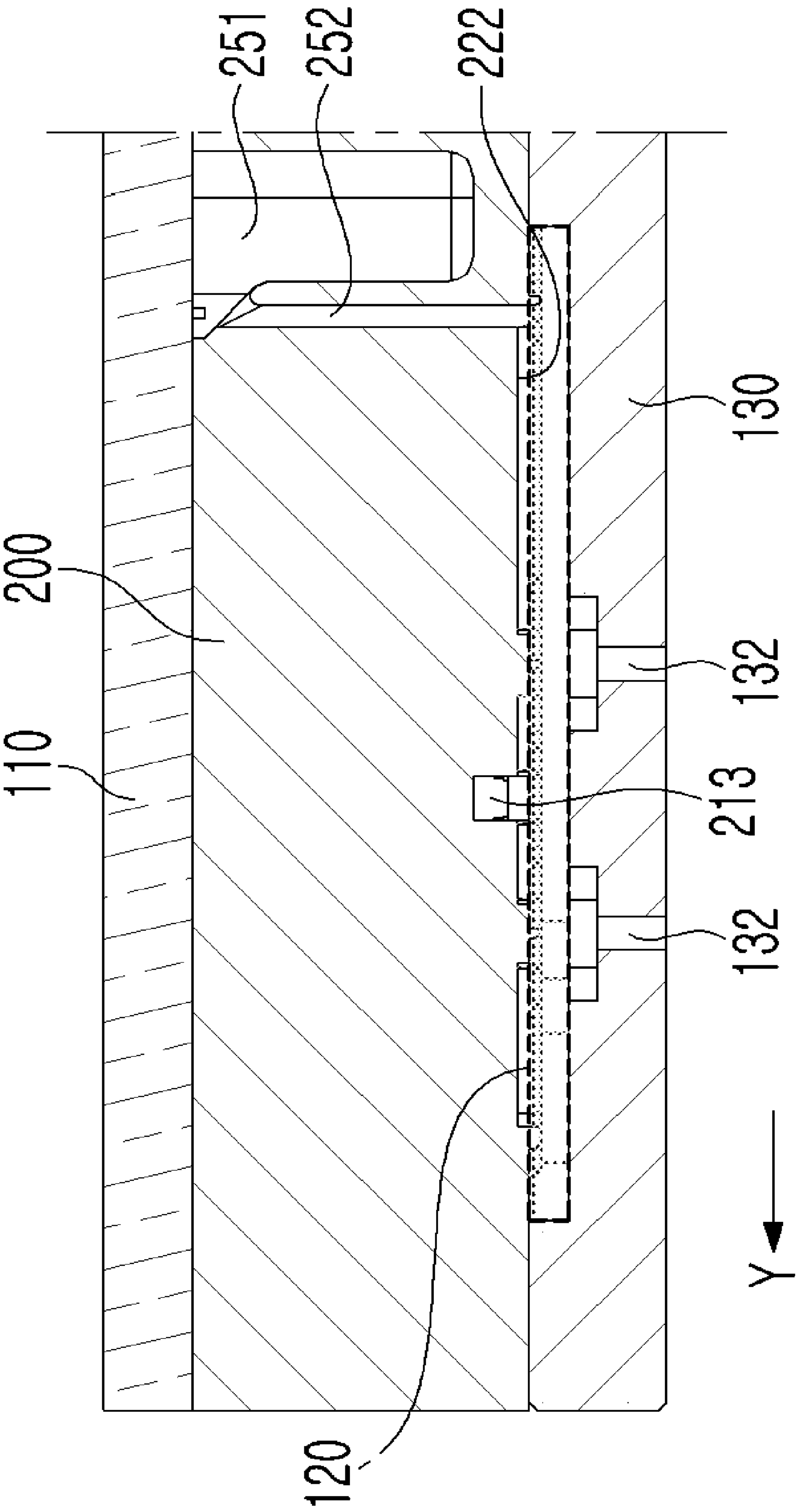
FIG. 3 is a cross-sectional view in the Y-direction of a cartridge according to an embodiment of the present specification.

A cartridge according to an embodiment will be described with reference to FIGS. 1 to 3. FIG. 1 is a top perspective cross-sectional view illustrating a cartridge according to an embodiment of the present specification. FIG. 2 is a bottom perspective cross-sectional view thereof. FIG. 3 is a cross-sectional view in the Y-direction of a cartridge according to an embodiment of the present specification.

The cartridge 100 according to an embodiment may comprise a mainframe 200, an elastic member 120 located on a front side of the mainframe 200, a cover 110 located on a back side of the mainframe 200, and a subframe 130 located on a front side of the mainframe 200 with the elastic member 120 being interposed therebetween.

The mainframe 200 may comprise, in the front side, a chamber, a passage connected to the chamber and a valve connected to the passage. The mainframe 200 may comprise, in the back side, a chamber, a passage connected to the chamber and a valve connected to the passage.

The chamber, passage, and valve may be shaped concavely from a plane of the front or back side of the mainframe 200. Alternatively, the passage and valve may be formed by a ridge protruding from a plane of the front or back side of the mainframe 200.

The passage may connect a chamber and a chamber, a chamber and a valve, or a valve and a valve. The passage includes a front passage in the front side of the mainframe 200, a back passage in the back side of the mainframe 200, and a through passage formed through the mainframe 200 to connect the front passage and the back passage. The through passage may be connected directly to the passage or connected indirectly to the passage via the chamber or valve.

The passage and valve are formed by a ridge protruding from a plane of the front or back side of the mainframe 200, and the ridge may be in contact with the cover 110, elastic member 120 or subframe 130 to prevent the leakage of a fluid. At least one ridge of the passage and valve may have the same height. For example, the ridge throughout the passage may have the same height, the ridge throughout the valve may have the same height, or the ridge of the passage and valve connected to each other may have the same height.

The passage and valve may be shaped concavely from a plane of the front or back side of the mainframe 200. The passage may be formed through the mainframe 200 in the planar direction. For example, a chamber path connecting two chambers distanced away from each other may be formed concavely from one side of the mainframe 200 and formed through the lateral side of the mainframe 200 adjacent to the first chamber to communicate with the second chamber.

The cover 110 may be configured to cover all or part of the back side of the mainframe 200 and seal the chamber, passage, and valve in the back side of the mainframe 200. The cover 110 may comprise a through hole 111 communicating with at least one of the chamber, passage, and valve in the back side of the mainframe 200. A fluid may be introduced or discharged via the through hole 111 in the cover 110. For example, some of the through holes 111 in the cover 110 may be used to inject at least one of a sample, reagent, and bead, and some of the through holes 111 may be used to supply or release an air pressure supplying a pressure to a fluid.

The elastic member 120 may be configured to cover all or part of the front side of the mainframe 200 and seal the chamber, passage and valve in the front side of the mainframe 200. The elastic member 120 is prepared from a material capable of elastic deformation and prevention of penetration of a fluid, and for example, the material may include elastomer. The elastic member 120 may be configured to cover part of the front side of the mainframe 200. Thus, the front side of the mainframe 200 may include a region facing the elastic member 120 and a region facing the subframe 130.

The subframe 130 may be coupled directly to the front side of the mainframe 200 or coupled thereto with the elastic member 120 being interposed therebetween. An accommodating groove 131 for accommodating the elastic member 120 may be placed in the back side of the subframe 130. The accommodating groove 131 may have the same planar shape as the elastic member 120 to prevent the elastic member 120 from moving in the planar direction. Alternatively, the accommodating groove 131 may be formed in the front side of the mainframe 200 or formed in both front side of the mainframe 200 and the back side of the subframe 130.

The accommodating groove 131 may have a depth slightly smaller than a depth of the elastic member 120. Thus, when the mainframe 200 and subframe 130 are in contact with each other to be coupled to each other, the elastic member 120 interposed between the mainframe 200 and subframe 130 may be in a compressed state in the thickness direction.

The subframe 130 may comprise at least one coupling hole for being coupled to the mainframe 200. For example, the coupling hole may be formed through the front side of the subframe 130 to extend to the front side of the mainframe 200. A coupling member such as a bolt or pin inserted into the coupling hole may couple the subframe 130 to the mainframe 200. The coupling hole may be disposed outside the accommodating groove 131 in which the elastic member 120 is accommodated.

The subframe 130 may comprise a pressure supply hole 132 formed therethrough for supplying a pressure to the elastic member 120. The pressure supply hole 132 may communicate with a pressure supply unit of a detection apparatus. For example, the detection apparatus may comprise an air pressure pump, and a positive pressure or a negative pressure generated from the air pressure pump may be delivered to the elastic member 120 through the pressure supply hole 132.

The elastic member 120 may have a shape of a sheet, pad, or membrane. Preferably, the elastic member 120 may have a pad shape having a thickness of allowing elastic deformation in the thickness direction.

The valve 230 may be a normally open (NO) valve 230 that is closed when a pressure is supplied to the elastic member 120 through the pressure supply hole 132 of the subframe 130. Specifically, when a pressure is supplied to the elastic member 120 through the pressure supply hole 132 of the subframe 130, the elastic member 120 is deformed to close the valve 230 in the mainframe 200. When a pressure is released from the pressure supply hole 132, the elastic member 120 is elastically restored to open the valve 230.

Figure 4:
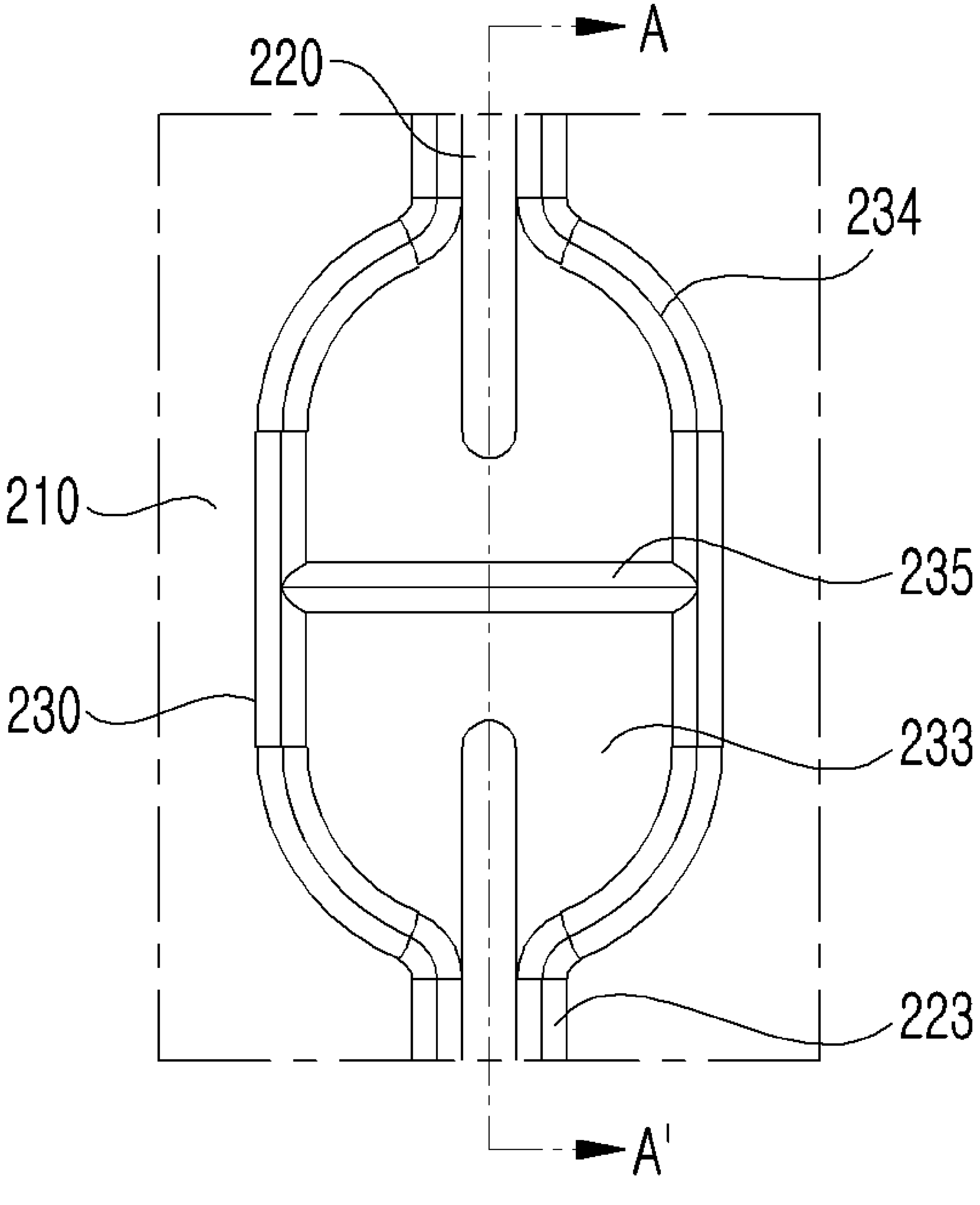
FIG. 4 is a plan view illustrating a bottom view of a valve of a cartridge according to an embodiment of the present specification.
Figure 5:
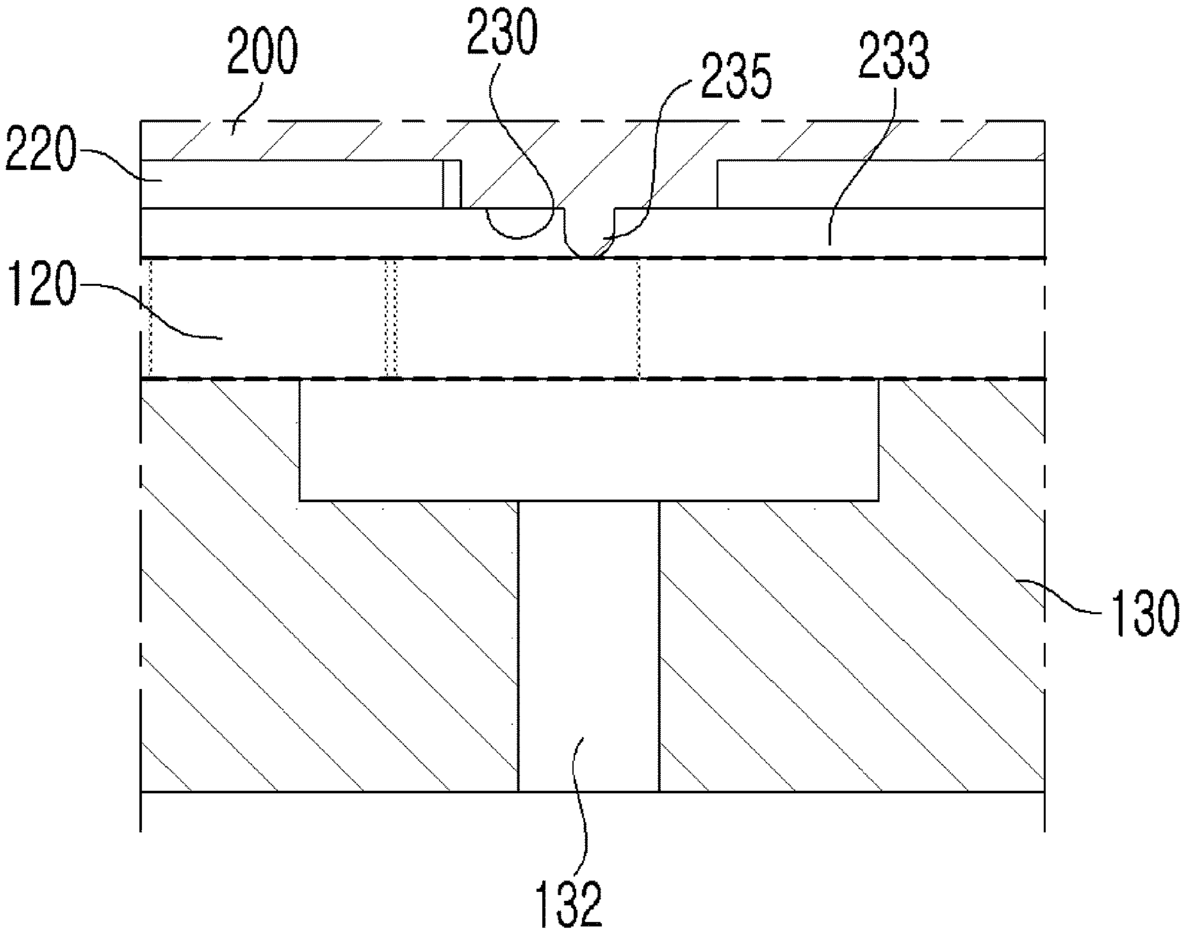
FIG. 5 is a cross-sectional view in the A-A' line of FIG. 4.
Figure 6:
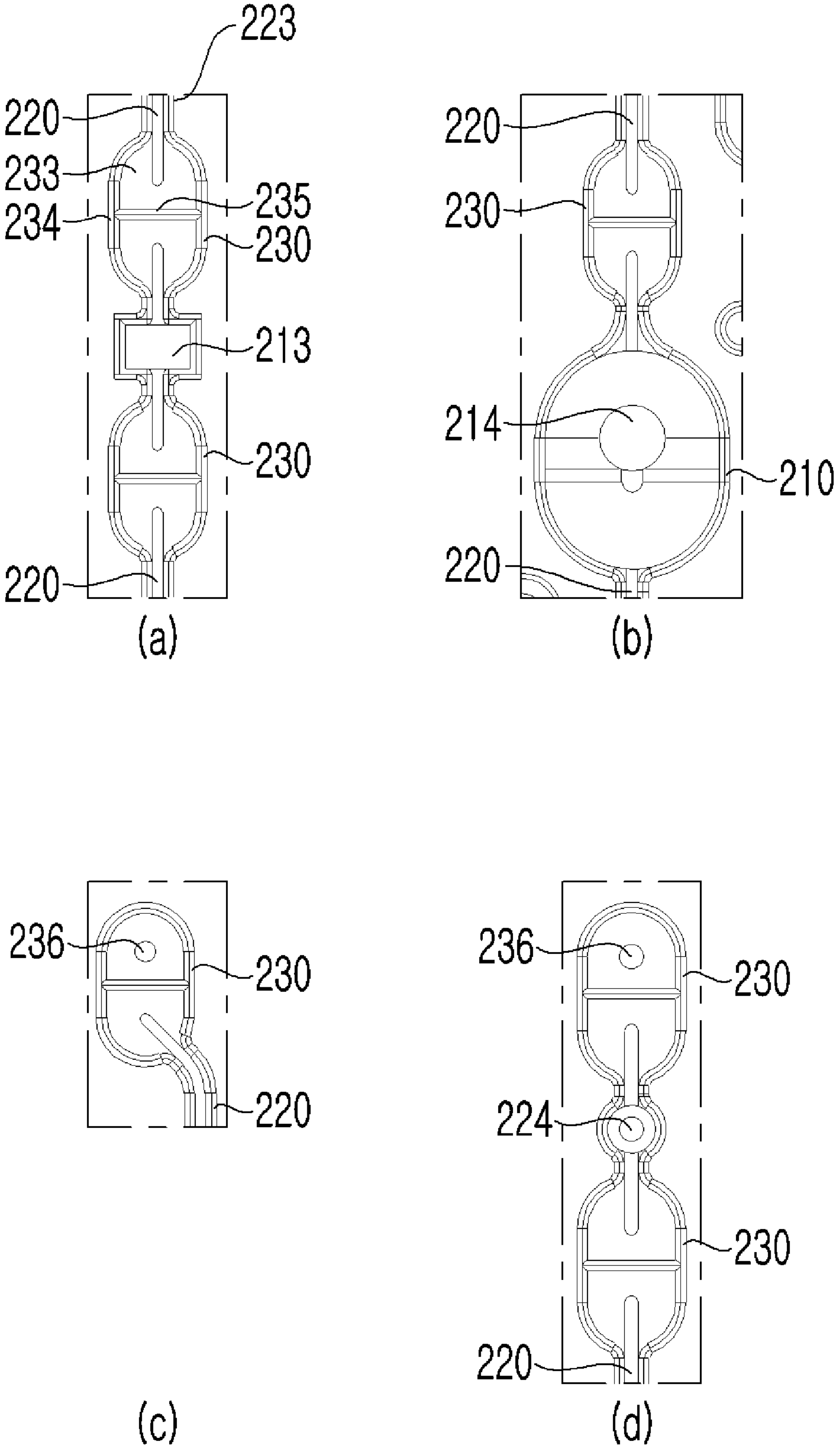
FIG. 6 is a plan view illustrating various types of valves.

Next, a valve will be described in detail with reference to FIGS. 4 to 6. FIG. 4 is a plan view illustrating a bottom view of a valve of a cartridge according to an embodiment of the present specification, and FIG. 5 is a cross-sectional view in the A-A' line thereof. And FIG. 6 is a plan view illustrating various types of valves.

The valve 230 may comprise a valve chamber 233 fluidly connected with a passage 220 and a fluid resistance element 235 supplying a fluid resistance force in the flow direction of a fluid passing through the valve chamber 233.

The valve chamber 233 may have a width greater than a width of the passage 220. A portion of the valve chamber 233 which is connected with the passage 220 may have a shape that narrows in the direction of the passage 220. Thus, the generation of bubbles caused by a sudden change in shape at the connection portion of the passage 220 and valve chamber 233 may be prevented.

The valve chamber 233 may have a depth shallower than a depth of the passage 220. The passage 220 may extend to the inside of the valve chamber 233. Accordingly, in the valve chamber 233, there are portions with different depths.

The fluid resistance element 235 is configured to cross over the valve chamber 233 in the width direction, and for example, the fluid resistance element may be a ridge. A passage wall 223 forming the passage 220 and a valve wall 234 forming the valve chamber 233 may also be a ridge. The passage wall 223, valve wall 234 and fluid resistance element 235 may be a ridge arranged in one side of the mainframe 200 with the same height.

When the passage 220 is connected to both sides of the valve chamber 233, the valve chamber 233 may be symmetric in the fluid flow direction. The fluid resistance element 235 may be configured to cross over the valve chamber 233 in the direction perpendicular to the fluid flow direction to supply a resistance force to the fluid flow direction.

An inlet of a pressure supply hole 132 may be disposed in the front side of the subframe 130, and an outlet of the pressure supply hole 132 may be disposed in the back side of the subframe 130. The outlet of the pressure supply hole 132 may have an area greater than an area of the inlet of the pressure supply hole 132. The pressure supply hole 132 may have a shape which broadens from the front side of the subframe 130 to the back side thereof or may be provided with a step in the middle such that the width changes non-continuously.

The inlet of the pressure supply hole 132 may be located at the center of the outlet. When the outlet of the pressure supply hole 132 has a width and a length which are different from each other, the inlet of the pressure supply hole 132 may be located at a point where the center of the width of the outlet and the center of the length thereof intersects.

When the elastic member 120 is in a compressed state between the mainframe 200 and subframe 130, the pressure is brought to bear on the valve wall 234 at the edge of the valve chamber 233. Thus, the leakage of a fluid through the valve wall 234 may be prevented when the valve 230 is in an open state.

The outlet of the pressure supply hole 132 may have a shape corresponding to the edge of the valve chamber 233 or be disposed inside the edge of the valve chamber 233, with the elastic member 120 being interposed therebetween. Thus, when a pressure is supplied through the pressure supply hole 132, the leakage of a fluid through the valve wall 234 may be prevented.

The pressure supply hole 132 may be located above the fluid resistance element 235 with the elastic member 120 being interposed therebetween. Preferably, the inlet of the pressure supply hole 132 may be located above the fluid resistance element 235. The elastic member 120 may be in contact with the valve wall 234 and fluid resistance element 235. Thus, when a pressure is supplied through the pressure supply hole 132, the elastic member 120 is compressed such that the valve wall 234 and the fluid resistance element 235 are pressurized, and the flow of a fluid is blocked in the valve 230.

(a) of FIG. 6 illustrates an embodiment in which a chamber path 213 is arranged between valves 230. A passage 220 is connected to both sides of each of the two valves 230 adjacent to each other, and the passage 220 between the two valves 230 may communicate with the chamber path 213. The chamber path 213 is a path connecting chambers (not shown) located at both sides and may cross and join with the passage 220 connecting the valves 230. Thus, a fluid of the chamber path 213 may flow through the valve 230 in an open state. For example, when the valves 230 at both sides of the chamber path 213 are in a closed state, a fluid flows only through the chamber path 213, and when any one of the valves 230 is open, the fluid may flow through the open valve 230. To facilitate the flow of a fluid, an air pressure may be supplied from any one of the chambers 210.

(b) of FIG. 6 illustrates an embodiment in which a valve 230 and a chamber 210 are connected to each other. A passage 220 may be connected to one side of the valve 230, and a chamber 210 may be connected to another side thereof. Also, a valve 230 may be connected to one side of a chamber 210, and a passage 220 may be connected to another side thereof. The chamber 210 may comprise a chamber connector 214 therein. The chamber connector 214 is a path formed through the mainframe 200, and may be connected to a chamber 210, passage 220 or valve 230 formed in the opposite side of the mainframe 200. A fluid may be introduced into the chamber 210 through the chamber connector 214 or a fluid inside the chamber 210 may be discharged therethrough. Alternatively, an air pressure may be delivered through the chamber connector 214 to raise or lower the pressure inside the chamber 210.

(c) of FIG. 6 illustrates an embodiment in which a passage 220 is connected only to one side of a valve 230. A valve connector 236 may be located at one side of a fluid resistance element 235 in the valve 230, and a passage 220 may be connected to another side thereof. The valve connector 236 is a path formed through the mainframe 200, and may be connected to a chamber 210, passage 220 or valve 230 formed in the opposite side of the mainframe 200. A fluid may be introduced into a valve chamber 233 through the valve connector 236 or a fluid inside the valve chamber 233 may be discharged therethrough. Alternatively, an air pressure may be delivered through the valve connector 236 to raise or lower the pressure inside the valve chamber 233.

(d) of FIG. 6 illustrates an embodiment in which a passage connector 224 is arranged between valves 230. The two valves 230 adjacent to each other are connected by a passage 220. For one valve 230, a valve connector 236 may be located at one side of a fluid resistance element 235 and a passage 220 may be connected to another side thereof. For another valve 230, a passage 220 may be connected to both sides thereof. The passage 220 between the two valves 230 may communicate with the passage connector 224. The passage connector 224 is a path formed through the mainframe 200, and may be connected to a chamber 210, passage 220 or valve 230 formed in the opposite side of the mainframe 200. A fluid may be introduced into the passage 220 through the passage connector or a fluid inside the passage 220 may be discharged therethrough. Alternatively, an air pressure may be delivered through the passage connector 224 to raise or lower the pressure inside the passage 220.

Embodiments of the present invention may include other types of valves 230 than those illustrated in (a) to (d) of FIG. 6.

Turning back to FIG. 1 to FIG. 3, the first valve 231 and second valve 232 are arranged in parallel in the Y-direction and are connected to the passage 220 passing between the first chamber 211 and second chamber 212. Specifically, one side of the first valve 231 is connected to a detection passage 221, and another side thereof is connected to the second valve 232. One side of the second valve 232 is connected to the first valve 231, and another side thereof is connected to a waste chamber 251 through a waste passage 222, 252.

The waste chamber 251 is provided in a recessed shape from the back side of the mainframe 200. And the waste passage 222, 252 include a first waste flow path 252 connected to the front surface of the mainframe 200 through the mainframe 200 and a second waste flow path 222 extending along the front side of the mainframe 200.

And each of the connection paths 241 to 246 is formed through the mainframe 200 and connected to the front side of the mainframe 200. The air pressure path 240 is formed through the mainframe 200 and connected to the front side of the mainframe 200.

The above-described description of the present invention is intended for illustration, and a person having ordinary knowledge in the art to which the present invention pertains will understand that the present invention may be easily modified and changed in other various forms without departing from the essential features of the present invention. Thus, the embodiments of the present invention are for illustrative purposes only, and the scope of the present invention is not limited to the present invention. It should be construed that the protection scope of the present invention is defined by the accompanying claims, and all equivalents fall within the scope of the present invention.

DESCRIPTION OF REFERENCE NUMERAL

- 100: cartridge for detecting target analyte
- 110: cover, 111: through hole
- 120: elastic member
- 130: subframe, 131: accommodating groove, 132: pressure supply hole
- 200: mainframe,
- 210: chamber, 213: chamber path, 214: chamber connector,
- 220: passage, 221: detection passage, 222: waste passage, 223: passage wall, 224: passage connector,
- 230: valve, 231: first valve, 232: second valve, 233: valve chamber, 234: valve wall, 235: fluid resistance element, 236: valve connector,

240: air pressure path, 241~246: connection paths,
251: waste chamber, 252: waste passage.

What is claimed is:

1. A cartridge for detecting a target analyte, comprising:
a mainframe comprising a chamber, a passage connected to the chamber, and a valve connected to the passage on a front side of the mainframe;
a pad formed by an elastic member disposed on the front side of the mainframe and covering at least the valve; and
a subframe disposed on the front side of the mainframe such that the elastic member is interposed between the mainframe and the subframe,
the subframe comprising a pressure supply hole aligned with the valve,
wherein the valve comprises:
a valve chamber fluidly connected to the passage and having a width greater than a width of the passage; and
a fluid resistance element formed as a ridge protruding from the front side of the mainframe and extending across the valve chamber in a width direction,
wherein the pressure supply hole is aligned with the fluid resistance element, and
wherein the valve is a normally open (NO) valve configured to close upon application of pressure to the elastic member through the pressure supply hole.

2. The cartridge according to claim 1, wherein a portion of the valve chamber connected to the passage narrows toward the passage.

3. The cartridge according to claim 1, wherein a depth of the valve chamber is less than a depth of the passage.

4. The cartridge according to claim 1, wherein the fluid resistance element, a passage wall defining the passage, and a valve wall defining the valve chamber are disposed on the front side of the mainframe and extend to an equal.

5. The cartridge according to claim 4, wherein each of the passage wall and the valve wall is formed as a ridge protruding from the front side of the mainframe.

6. The cartridge according to claim 1, wherein the pressure supply hole comprises an inlet disposed at a front side of the subframe, and an outlet disposed at a back side of the subframe facing the elastic member, the outlet having an area greater than an area of the inlet.

7. The cartridge according to claim 6, wherein the outlet of the pressure supply hole has a shape corresponding to the edge of the valve chamber or is disposed inside the edge of the valve chamber.

8. The cartridge according to claim 1, wherein the passage comprises a front passage disposed on the front side of the mainframe, a back passage disposed on a back side of the mainframe, and a through passage extending through the mainframe to fluidly connect the front passage and the back passage.

9. The cartridge according to claim 8, wherein a first end of the through passage is disposed in the valve chamber, and a second end of the through passage is fluidly connected to the back passage.

10. The cartridge according to claim 8, wherein the valve comprises a first valve chamber positioned on an inlet side of the fluid resistance element and fluidly connected to the front passage or the back passage, and a second valve chamber positioned on an outlet side of the fluid resistance element and fluidly connected to the through passage.

11. An apparatus for detecting a target analyte, comprising an air pressure pump supplying an air pressure to the pressure supply hole of cartridge according to claim 1.

12. The apparatus according to claim 11, further comprising a mounting unit for mounting the cartridge.

* * * * *